US009060650B2

(12) United States Patent
De' Longhi

(10) Patent No.: US 9,060,650 B2
(45) Date of Patent: Jun. 23, 2015

(54) APPLIANCE FOR THE TREATMENT OF A LIQUID FOOD

(75) Inventor: Giuseppe De' Longhi, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 413 days.

(21) Appl. No.: 13/574,796

(22) PCT Filed: May 26, 2011

(86) PCT No.: PCT/EP2011/058686
§ 371 (c)(1),
(2), (4) Date: Aug. 17, 2012

(87) PCT Pub. No.: WO2011/151258
PCT Pub. Date: Dec. 8, 2011

(65) Prior Publication Data
US 2013/0186286 A1    Jul. 25, 2013

(30) Foreign Application Priority Data
Jun. 3, 2010    (IT) .............................. MI2010A1000

(51) Int. Cl.
| A47J 43/08 | (2006.01) |
| B01F 13/08 | (2006.01) |
| A47J 43/044 | (2006.01) |
| A47J 27/00 | (2006.01) |
| A47J 36/16 | (2006.01) |

(52) U.S. Cl.
CPC .............. *A47J 43/08* (2013.01); *B01F 13/0818* (2013.01); *A47J 43/044* (2013.01); *A47J 2043/04436* (2013.01); *A47J 27/004* (2013.01); *A47J 36/165* (2013.01); *A47J 43/082* (2013.01)

(58) Field of Classification Search
CPC ................ A47J 43/044; A47J 43/0465; A47J 2043/04436; A47J 2043/04427; A47J 2043/04418; B01F 13/0818; B01F 13/08

USPC ......... 99/348, 323.1; 366/273, 274, 249, 144, 366/146, 242, 244, 243

See application file for complete search history.

(56) References Cited

U.S. PATENT DOCUMENTS

| 2,689,114 | A | * | 9/1954 | Hammond, Jr. | ............... 366/206 |
| 4,534,656 | A | * | 8/1985 | de Bruyne | ..................... 366/247 |
| 4,678,881 | A | * | 7/1987 | Griffith | ........................ 219/631 |
| 8,621,985 | B2 | * | 1/2014 | Elissen | ......................... 99/323.1 |
| 8,807,824 | B2 | * | 8/2014 | Bodum | ............................ 366/277 |
| 2001/0043508 | A1 | * | 11/2001 | Zhou | ........................... 366/273 |
| 2007/0053238 | A1 | * | 3/2007 | Kocienski | ..................... 366/273 |
| 2009/0251113 | A1 | | 10/2009 | Raghuprasad | |

FOREIGN PATENT DOCUMENTS

| DE | 19645564 | 5/1998 |
| DE | 102004043579 | 5/2006 |
| WO | WO2010/128857 | 11/2010 |

OTHER PUBLICATIONS

International Search Report; International Application No. PCT/EP2011/058686; International Filing Date May 26, 2011; 4 pages.

* cited by examiner

Primary Examiner — Reginald L Alexander
(74) Attorney, Agent, or Firm — Blank Rome LLP

(57) ABSTRACT

An appliance for the treatment of a liquid food comprises a container (2) for the liquid food, a support (3) for the container (2), a cover (4) to close container (2), a hermetically sealed chamber (6) within the cover (4), a tool (5) rotating inside the container (2) for the treatment of the liquid food, a primary electrical winding (9) held by the support (3) and suitable to transfer energy by magnetic induction to a secondary electrical winding (7) positioned inside the hermetically sealed chamber (6), and a motor (8) driving the rotation of the tool (5) positioned within the hermetically sealed chamber (6) and electrically powered by the secondary winding (7).

15 Claims, 2 Drawing Sheets

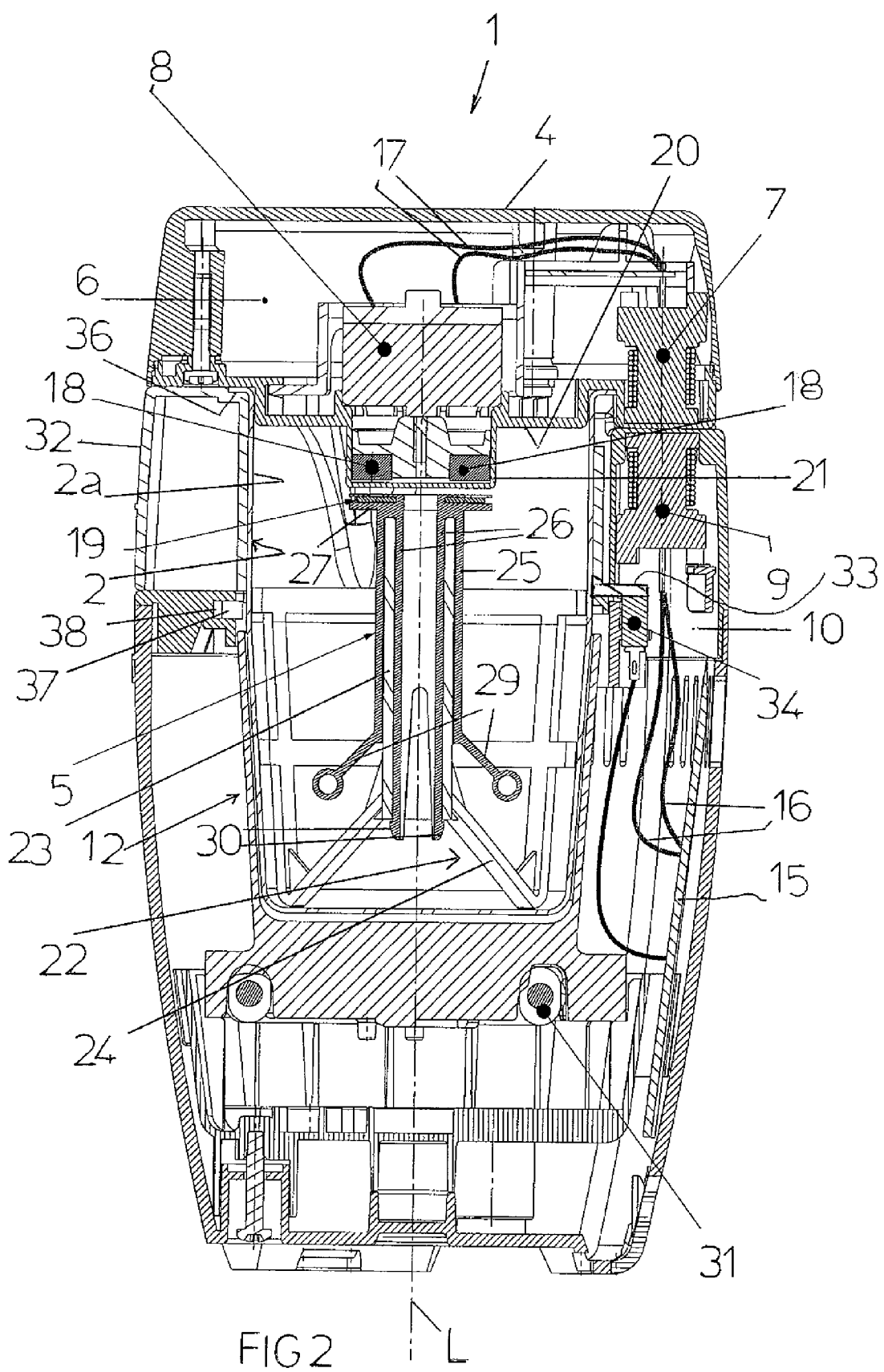

APPLIANCE FOR THE TREATMENT OF A LIQUID FOOD

The present invention relates to an appliance for the treatment of a liquid food, in particular but not exclusively to a milk frother.

A traditional milk frother comprises a container in which there is a rotating whisk capable of encapsulating air into the milk.

The whisk may be supported by the cover of the container or by the container itself and its rotation is due to an electric gearmotor.

One major drawback of a traditional milk frother consists in the difficulty of inspecting and cleaning its constituent parts, especially the container, the whisk and the cover, where encrustations tend to build up in positions that are also difficult to see or reach.

Moreover, the electric wiring of the milk frother is characterized by exposed terminals and is hence potentially dangerous in the presence of water.

The technical task the present invention has set itself is therefore to realize an appliance for the treatment of a liquid food which allows the aforementioned technical drawbacks of the prior art to be overcome.

Within the scope of this technical task, one object of the invention is to realize an appliance for the treatment of a liquid food that is easily dismountable for inspection of its constituent parts, and for the cleaning and washing thereof by hand or in a dishwasher, with particular reference to those that during use become dirtied with the liquid food treated.

Another object of the invention is to realize an appliance for the treatment of a liquid food that is extremely practical and convenient to use.

The technical task, as well as these and other objects, according to the present invention are achieved by realizing an appliance for the treatment of a liquid food, characterized in that it comprises a container for the liquid food, a support for said container, a cover to close said container, a hermetically sealed chamber within said cover, a tool rotating inside said container for the treatment of said liquid food, a primary electrical winding held by said support and adapted to transfer energy by magnetic induction to a secondary electrical winding positioned inside said hermetically sealed chamber, and a motor driving the rotation of said tool, positioned within said hermetically sealed chamber and electrically powered by said secondary winding.

Preferably said support has an internal chamber within which at least said primary winding is positioned.

Preferably said support is externally configured so as to define a seat with a shape matching said container in order to house it.

Preferably said primary winding is positioned in a peripheral area of said support adjacent to a peripheral area of said cover in which said secondary winding is positioned.

Preferably there is a magnetic transmission of rotation between said motor and said tool.

Preferably inside said container there is a framework to support and guide the rotation of said tool.

Preferably inside said support there are means for the electrical heating of said container.

Preferably the appliance has means to select one of its operating programmes.

Preferably the operating programme is selectable at least between a programme in which only said tool is driven in rotation, a programme in which only said means for electrical heating are activated, and a programme in which both said tool is driven in rotation and said means of electrical heating are activated.

Preferably the means of selection comprise a rotatable ring supported by said support and having a feeler pin adapted to interact with a plurality of microswitches as a function of the angular position of said ring.

Preferably said ring is positioned around a perimeter section of a portion of said container protruding outside said seat.

Preferably said ring and said peripheral area of said support circumscribe said portion of said container protruding outside said seat.

Preferably said primary winding, said plurality of microswitches, and said electrical heating means are connected to an electronic control board positioned inside said support.

Preferably said container has an external flange on the perimeter of its apex supporting a shoulder of said ring.

Preferably said cover has a lower protrusion with a shape matching the mouth of said container, with which it is removably engageable.

In a preferred application the appliance is a milk frother in which said tool is a whisk capable of encapsulating air into the milk.

Further characteristics and advantages of the invention will be more apparent from the description of a preferred, but not exclusive embodiment of the appliance for the treatment of a liquid food according to the invention, illustrated by way of non-restrictive example in the appended drawings, in which:

FIG. 2 shows a side elevation view, vertically sectioned along a central plane containing the main axis of the milk frother of FIG. 1.

Figure 1:
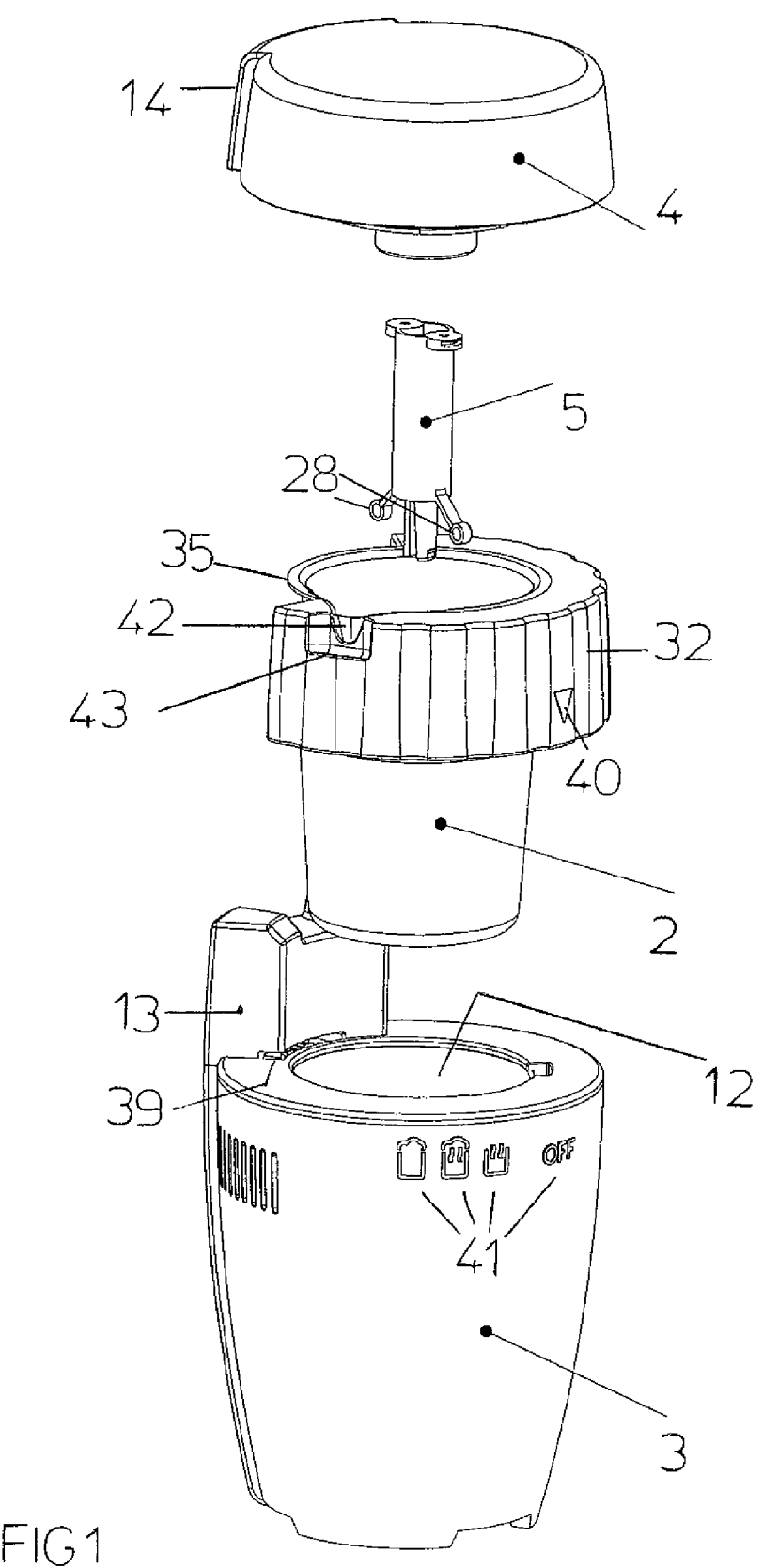
FIG. 1 shows a perspective exploded view of the milk frother.

With reference to the aforementioned figures, there is shown an appliance for the treatment of a liquid food, in the case considered in particular a milk frother 1.

The milk frother 1 comprises a container 2 for the milk, a support 3 of the container 2, a cover 4 to close the container 2, and a tool, in particular a whisk 5, rotating inside the container 2 to favour the encapsulation of air into the milk.

The container 2 for the milk, the support 3 for the container 2, the cover 4 to close the container 2 and the whisk 5 are in this specific case coaxial with the main central axis L of the milk frother 1.

The cover 4 is removably engaged with the container 2 with the aid of a lower protrusion 20 which has a shape matching the mouth of the container 2.

The support 3 holds a primary electrical winding 9 adapted to transfer energy by magnetic induction to a secondary electrical winding 7 positioned inside a hermetically sealed chamber 6 provided within the cover 4.

Inside the hermetically sealed chamber 6 of the cover 4 there is also a motor 8 driving the rotation of the whisk 5.

The motor 8, positioned coaxially with the whisk 5, is electrically powered by the secondary winding 7 via electrical wires 17.

The support 3 has an internal chamber 10 in which there are present both the primary winding 9 and a power board 15, which electrically powers the primary winding 9 via electrical wires 16.

The primary winding 9 is positioned in a peripheral area 13 of the support 3 adjacent to a peripheral area 14 of the cover 4 in which the secondary winding 7 is positioned.

The support 3 is externally configured so as to define a seat 12 with a shape matching the container 2.

The seat 12 only partly houses the container 2, the upper portion 2a thereof in particular protruding outside the seat 12.

The peripheral area 13 of the support 3 is shaped as a projecting portion that extends above the seat 12 at the side of the upper portion 2a of the container 2.

The motor 8 and the whisk 5 are facing each other but are not directly in contact since there is advantageously envisaged a magnetic transmission of rotation from one to the other.

The motor 8 has in fact two permanent magnets 18 capable of magnetically interacting with a magnetic, preferably ferromagnetic, plate 19, which is integral with the apex end of the whisk 5. Alternatively, the magnetic plate can also be replaced by one or more permanent magnets.

The magnets 18 are positioned in a central lowered area 21 of the lower protrusion 20 of the cover 4.

Inside the container 2 there is a framework 22 to support and guide the rotation of the whisk 5.

The framework 22 has a central sleeve 23 and a structure 24 resting on the bottom and against the side wall of the container 2, configured so as to maintain the central sleeve 23 in a centred position coaxial with the axis L of the milk frother 1.

The whisk 5 consists of a single shaped body to which the ferromagnetic plate 19 is applied.

In particular, the shaped body of the whisk 5 has an external tubular portion 25 and a pair of rod-shaped portions 26, which extend inside the tubular portion 25 and protrude from the end thereof opposite the one in which there is a portion 27 supporting the ferromagnetic plate 19.

Extending from the external tubular portion 25 there are two diametrically opposed arms 29 having at their ends an eyelet 28, which during the rotation of the whisk 5 favours the encapsulation of air into the milk.

The rod-shaped portions 26 have a snap tooth 30 at their ends.

The radial distance between each of the rod-shaped portions 26 and the tubular portion 25 is approximately equal to the thickness of the wall of the sleeve 23, and the inside diameter of the tubular portion 25 is approximately equal to the outside diameter of the sleeve 23.

The whisk 5 is removably engaged in the framework 22 in the following manner.

The whisk 5 is moved in translation coaxially with the sleeve 23 so as to slide the two rod-shaped portions 26 along diametrically opposed internal cylindrical generatrices of the sleeve 23 and the tubular portion 25 along the outer surface of the sleeve 23.

In this phase the rod-shaped portions 26 radially retract to a slight degree with a small elastic deformation.

The translation ends when the snap teeth 30 engage the edge at the end of the sleeve 23.

The support 3 has internal means for the electrical heating of the container 2, and in particular an electric heating element 31 positioned below the bottom of the container 2 and electrically powered by the electronic power board 15.

The milk frother 1 has means to select one of its operating programmes.

The means of selection comprise an open ring 32 coaxial with the axis L and supported by the support 3 in a rotatable manner about the axis L itself.

The ring 32 and the projecting peripheral area 13 of the support 3 circumscribe the upper portion 2a of the container 2.

The container 2 has an external flange 35 on the perimeter of its apex supporting a shoulder 36 formed on the internal perimeter edge at the apex of the ring 32, and a spout 42 for pouring milk positioned in a recess 43 of the ring 32.

The ring 32 moreover has a tab 37 slidingly inserted in a groove 38 of the wall of the support 3 which laterally delimits the seat 12, so as to be permanently anchored to the seat 12 albeit with the possibility of rotating about the axis L.

The projecting peripheral area 13 of the support 3 has a slot 39 through which a feeler pin 33 penetrates into the chamber 10, the feeler pin 33 being integral with the ring 32 and adapted to interact, as a function of the angular position of the ring 32, with several microswitches present in the chamber 10 which are connected to the power board 15.

In particular, there are three microswitches, of which the one indicated as 34 is illustrated.

The three microswitches control the switching off and three operating programmes of the milk frother 1, selectable by rotating the ring 32.

The off status or selected programme is visually indicated by the alignment of a mark 40 on the ring 32 with one of four graphic symbols 41 on the support 3.

The first microswitch controls the switching off of the milk frother 1, whereas the second and third microswitches control the three operating programmes, a first programme for production of cold frothed milk, a second programme for production of hot milk and a third programme for production of hot frothed milk, according to whether only the second, only the third or simultaneously the second and third microswitches are activated.

The milk frother 1 is extremely practical because its parts that become dirty during use can be easily dismounted for washing by hand or in a dishwasher.

In particular, the cover 4 can be detached from the support 3, and being hermetically sealed it can be safely washed separately from the other parts of the milk frother 1.

The whisk 5 can be easily removed from the framework 22 by pressing lightly on the snap teeth 30 and can thus be washed separately from the other parts of the milk frother 1.

The framework 22 can be easily removed from the container 2, in which it simply rests, and can thus be washed separately from the other parts of the milk frother 1.

The container 2 can be easily removed from the seat 12 and from the ring 32, on which it simply rests, and can thus be washed separately from the other parts of the milk frother 1.

The ring 32 can also be easily detached from the support 3 with a rotation that causes the tab 37 to come out of the groove 38 and the feeler pin 33 out of the slot 39.

The appliance for the treatment of a liquid food thus conceived is susceptible of numerous modifications and variants, all falling within the scope of the inventive concept; moreover, all the details may be replaced with other technically equivalent elements.

In practice, the materials used, as well as the dimensions, can be any whatsoever according to needs and the state of the art.

The invention claimed is:

1. An appliance for the treatment of a liquid food, comprising:
   a container configured to house liquid food;
   a support for the container, wherein the container is configured for removal from the support;
   a cover to close the container;
   a hermetically sealed chamber within the cover;
   a tool rotating inside the container for the treatment of the liquid food;

a primary electrical winding held by the support and suitable to transfer energy by magnetic induction to a secondary electrical winding positioned inside the hermetically sealed chamber; and a motor driving the rotation of the tool, the motor being positioned within the hermetically sealed chamber and electrically powered by the secondary winding.

2. The appliance of claim 1, wherein the support has an internal chamber within which at least the primary winding is positioned.

3. The appliance of claim 2, wherein the support is externally configured to define a seat having a shape matching a shape of the container in order to house the container.

4. The appliance of claim 1, wherein the primary winding is located in a peripheral area of the support adjacent to a peripheral area of the cover in which the secondary winding is positioned.

5. The appliance of claim 1, wherein the appliance has a magnetic transmission of rotation between the motor and the tool.

6. The appliance of claim of claim 1, wherein, on an inside of the container there is a framework to support and guide the rotation of the tool.

7. The appliance of claim 1, further comprising an electric heater to heat the container, the electric heater located inside the support.

8. The appliance of claim 7, further comprising an open ring coaxial with a longitudinal axis of the appliance, the open ring facilitating selection of at least one operating program of the appliance.

9. The appliance of claim 8, wherein at least one operating program is selectable between a program where the tool is driven in rotation, a program wherein the electric heater is activated, and a program where both the tool is driven in rotation and the electrical heater is activated.

10. The appliance of claim 8, wherein the open ring is rotatably supported by the support and includes a feeler pin capable of interacting with a plurality of microswitches as a function of the angular position of the open ring to facilitate selection of at least one operating program of the appliance.

11. The appliance of claim 8, wherein the support is externally configured to define a seat having a shape matching a shape of the container in order to house the container, and wherein the open ring is positioned around a perimeter section of a portion of the container protruding outside the seat.

12. The appliance of claim 11, wherein the open ring and a peripheral area of the support circumscribe the portion of the container protruding outside the seat.

13. The appliance of claim 8, wherein the container has an external flange on a perimeter of its apex supporting a shoulder of the open ring.

14. The appliance of claim 1, wherein the cover has a lower protrusion with a shape matching a mouth of the container facilitating removable engageability of the cover and the container.

15. The appliance of claim 1, wherein the appliance is a milk frother, and wherein the tool is a whisk capable of encapsulating air into milk within the container.

* * * * *